United States Patent Office 3,816,535
Patented June 11, 1974

3,816,535
PROCESS FOR THE CATALYTIC ISOMERIZATION OF UNSATURATED KETONES
Marianne Hug-Inderbitzin, Schwerzenbach, Mario Pesaro, Zurich, and Peter Schudel, Grut, near Wetzikon, Switzerland, assignors to Givaudan Corporation, Clifton, N.J.
No Drawing. Filed Dec. 24, 1970, Ser. No. 101,402
Claims priority, application Switzerland, Dec. 20, 1969, 19,397/69
Int. Cl. C07c 45/00
U.S. Cl. 260—586 R                        9 Claims

ABSTRACT OF THE DISCLOSURE

There is provided a process for the catalytic isomerisation of olefinically unsaturated compounds to thermodynamically more stable isomers, in which there is used as the catalyst a salt of a transition element of the 4th period of the periodic system having an atomic weight greater than 50.

FIELD OF THE INVENTION

Transition metal catalytic isomerisation of unsaturated compounds.

RELATED APPLICATIONS

This application claims priority from the corresponding Swiss patent application No. 19,397/69 filed Dec. 30, 1969.

DESCRIPTION OF THE PRIOR ART

The catalytic isomerisation of olefinically unsaturated compounds is, for example, described in U.S. Patent Specifications Nos. 3,398,205 and 3,409,702. In accordance with U.S. Patent Specification No. 3,398,205, heavy metal carbonyls are used as catalysts for this recreation. According to U.S. Patent Specification No, 3,409,702, on the other hand, synergistic mixtures of ruthenium, palladium, rhodium and platinum on active charcoal are employed for the same purpose.

It is known, however, that the heavy metal carbonyls cannot be used at elevated temperatures due to thermal decomposition, and the mixtures of noble metals are not only expensive but decline in activity after repeated use. It was therefore believed desirable to obtain a group of catalysts which are cheap and also stable at high temperatures.

Misono et al. (*J. Catalysis, 10,* 88, (1968)) investigated the reaction of certain metal sulfates, *inter alia* copper and nickel sulfates, with 1- and 2-butenes and observed some isomerisation of the 1-butene to cis- and trans-2-butene and vice versa.

SUMMARY OF THE INVENTION

It has been found that salts of transition metals of the 4th period having an atomic number of 23 to 30 i.e. an atomic weight in excess of 50 are excellent catalysts for the transformation

where $R_2$ is monodeshydro ($R_1$) and $R_1$ is selected from the group consisting of radicals of the following general formulae

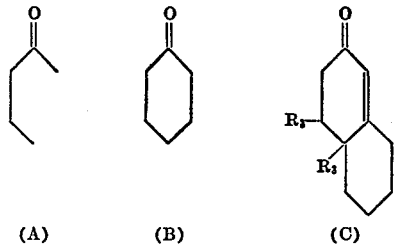

(A)    (B)    (C)

having one open single bond, one end whereof is attached to any carbon atom in the skeleton and $R_3$ is hydrogen or methyl. The $R_3$'s can be the same or different.

DESCRIPTION OF THE PREFERRED EMBODIMENTS

The process of the invention is carried out by simply treating the starting material with the catalyst.

The catalysts used in the present invention which are particularly suitable, are salts of chromium, manganese, iron, cobalt, nickel, copper or zinc. As salts there come into consideration, for example, the anhydrous or hydrous salts of mineral acids such as hydrohalic acids (e.g. hydrofluoric acid, hydrochloric acid, hydrobromic acid or hydroiodic acid); sulphuric acid, nitric acid or phosphoric acid. The chlorides of the above-mentioned metals have been found to be particularly suitable, such as $CrCl_3 \cdot 6H_2O$, $MnCl_2 \cdot 4H_2O$, $FeCl_3 \cdot 6H_2O$, $CoCl_2 \cdot 6H_2O$, $NiCl_2 \cdot 6H_2O$, $CuCl_2 \cdot 2H_2O$ or $ZnCl_2$. Also suitable are the sulfates $CuSO_4 \cdot 5H_2O$, $Fe_2(SO_4)3 \cdot xH_2O$, $CoSO_4 \cdot 7H_2O$ or the compound $FePO_4 \cdot 4H_2O$.

These salts are cheap and are also stable at higher temperatures. When using these materials the isomerisation time is shorter than that known heretofore, this is particularly conspicuous with $FeCl_3 \cdot 6H_2O$ or $CuCl_2 \cdot 2H_2O$.

By way of compounds of general formulae A, B, and C it shall be shown how the thermodynamically more unstable methylidene compounds A–II, B–II, and C–II can be rearranged to the more stable compounds A–1, B–1, and C–1 respectively with the aid of one of the above-named catalysts:

(a)

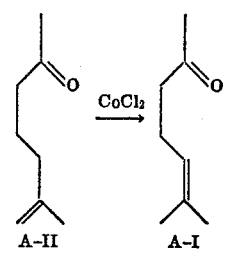

A-II    A-I (b)

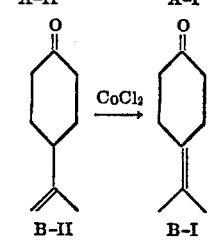

B-II    B-I (c)

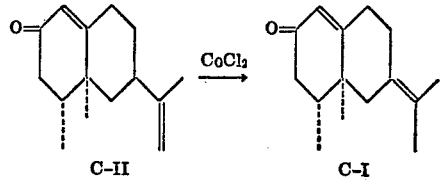

C-II    C-I

The starting material which is to be isomerized is suitably treated with the catalyst in the absence of a solvent, in which case reaction temperatures from room temperature to ca. 300° C. come into consideration; a range of 150–220° C. is preferred. The reaction can, for example, be carried out at pressures of 10⁻ torr to 50 atmospheres, preferably at 10⁻² torr to atmospheres.

As the reaction vessel there is expediently employed: a rotatably arranged glass tube which, after charging with starting material, catalyst and, possibly, solvent, is hermetically sealed under vacuum; a heatable stirring autoclave or a glass flask with reflux condenser. The amount of catalyst needed can, for example, amount to 0.1–10% of the substance to be isomerised; 1–5% are preferably employed in each case.

The reaction time is naturally governed by the reaction temperature, the type of the catalyst and the amount of the catalyst. For example, with otherwise constant parameters, for the cited catalysts the reaction time decreases in the sequence stated hereinafter:

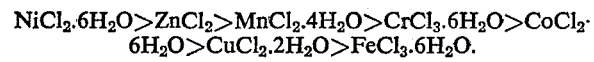

For example, the reaction time can amount from 5 minutes to 48 hours. Preferably one works in such a way that the completion of the reaction, i.e. the attainment of the optimal yield of the desired product, is effected within 20 minutes to 10 hours.

The working up of the reaction mixture can be carried out according to methods which are known per se; expediently, the catalyst is first removed from the reaction mixture by filtration. If the reaction was carried out in the absence of a solvent, it is recommended to first add a readily volatile solvent to the reaction mixture for this purpose.

The purification of the product (i.e. the separating off of unreacted starting material as well as of byproducts of the reaction) can, for example, be undertaken chromatographically and/or by distillation.

In the following Examples, the temperatures are stated in degrees centigrade.

Example 1

200 mg. of 4α,4aα-dimethyl-6β-isopropenyl-2,3,4,4a,5,6,7,8-octahydro-2-naphthalenone (nootkatone) and 5.5 mg. of cobalt (II) chloride hexahydrate are hermetically sealed under high vacuum in a Pyrex glass tube and heated at 220° for 20 minutes with constant agitation.

After cooling, the reaction mixture is taken up in ether, the ethereal suspension filtered over 0.5 g. of silica gel and the solvent removed from the filtrate by evaporation to yield 199 mg. of crude product. Gas-chromatographic analysis of this crude product gives a content of 63% 4α,4aα - dimethyl - 6 - isopropylidene-2,3,4,a,5,6,7,8-octahydro-2-napthalenone (α-vetivone) besides unreacted starting material and other double bond isomers. For purifying the α-vetivone, 10 g. of a mixture manufactured in the manner described above are first chromatographed on silica gel (150-fold amount) with hexane/acetic ester=5:1. After evaporation of the solvent from the eluate and short-path distillation of the residue (110–120°/0.01 torr) there result 3.83 g. of product which can be purified by means of recrystallization from pentane at —20°. There are thus obtained 2.34 g. of 4α,4aα-dimethyl-6 - isopropylidene - 2,3,4,4a,5,6,7,8-octahydro-6-naphthalenone (α-vetivone) of melting point 50.5–51°; IR spectrum: (CCl₄) bands at 1670, 1620 cm.⁻¹; UV spectrum: (ethanol) $\lambda_{max}$=232 nm. ($\epsilon$=14400); NMR spectrum: (CDCl₃) $\delta$=0.98 (s, 3H); 1.00 (d, 3H, J=7 cps.); 1.74 (s, 6H); 5.77 (s, 1H) p.p.m.; optical rotation: (ethanol) $[\alpha]_{589}^{22°}$=+231°.

The compound obtained is optically active α-vetivone. The identification with natural α-vetivone (from vetiver oil bourbon) was carried out by comparison of the UV, IR and NMR spectra in solution and by the optical rotation.

Example 2

500 mg. of nootkatone and 10 mg. of iron (III) chloride hexahydrate are hermetically sealed under high vacuum in a Pyrex glass tube and this is heated at 159° for 30 minutes with constant agitation. After cooling, the reaction mixture is taken up in ether, the ethereal suspension is filtered over 0.5 g. of silica gel and the solvent is removed from the filtrate by evaporation to yield 500 mg. of crude product. Short path distillation of this product (115–125°/0.06 torr) yields 445 mg. of oil, gas-chromatographic analysis of which gives a content of 56% α-vetivone besides starting material and other double bond isomers.

Example 3

200 mg. of nootkatone and 5.5 mg. of manganese (II) chloride tetrahydrate are hermetically sealed under high vacuum in a Pyrex glass tube and this is heated at 220° for 60 minutes with constant agitation. After cooling, the reaction mixture is taken up in ether and the ethereal mixture is filtered over 0.5 g. of silica gel and solvent removed from the filtrate by evaporation to yield 191 mg. of crude product. Short-path distillation of this product (100°/0.04 torr) yields 168 mg. of oil, gas-chromatographic analysis of which gives a content of 57% α-vetivone besides starting material and other double bond isomers.

Example 4

200 mg. of 4-isopropenyl-cyclohexanone and 5.5 mg. of cobalt (II) chloride hexahydrate are hermetically sealed under high vacuum in a Pyrex glass tube and this is heated at 160° for 150 minutes with constant agitation. After cooling, the reaction mixture is taken up in ether, the ethereal suspension filtered over 0.5 g. of silica gel and the solvent removed from the filtrate by evaporation to yield 100 mg. of crude product. Gas-chromatographic analysis of the crude product gives a content of 59% 4-isopropylidenecyclohexanone besides starting material and other double bond isomers.

Example 5

200 mg. of 4-isopropenyl-cyclohexanone and 5.5 mg. of nickel (II) chloride hexahydrate are hermetically sealed under high vacuum in a Pyrex glass tube and this is heated at 200° for 3½ hours with constant agitation. After cooling, the reaction mixture is taken up in ether, the ethereal suspension filtered over 0.5 g. of silica gel and the solvent removed from the filtrate by evaporation to yield 200 mg. of crude product. Gas-chromatographic analysis of the crude product gives a content of 56% 4-isopropylidene-cyclohexanone besides starting material and other double bond isomers.

To purify 4-isopropylidene-cyclohexanone, the mixture obtained according to Examples 4 and 5 is chromatographed on silica gel (100-fold amount). The ketone is eluted with hexane/ether=9:1. After evaporation of the solvent from the eluate and short-path distillation of the residue (60–80°/0.03 torr), there are obtained 26 mg. of 4-isopropylidene-cyclohexanone; IR spectrum (CCl₄): band at 1720 cm.⁻¹; NMR spectrum (CDCl₃): $\delta$=1.74 (s, 6H); 2.48 m, 8H) p.p.m.

Example 6

1 g. of 6-methyl-6-hepten-2-one and 25 mg. of cobalt (II) chloride hexahydrate are hermetically sealed under high vacuum in a Pyrex glass tube and this is heated at 184° for 30 minutes with constant agitation.

After cooling, the reaction mixture is taken up in ether, the ethereal suspension filtered over 0.5 g. of silica gel and the solvent removed by evaporation of the filtrate to yield 947 mg. of crude product. Gas-chromatographic analysis of the crude product gives a content of 50% 6-methyl-5-hepten-2-one besides starting material and byproducts. To purify 6-methyl-5-hepten-2-one, 600 mg. of this mixture are chromatographed on the 85-fold amount of silica gel. The ketone is eluted with hexane/ether=19:1. After evaporation of the solvent from the eluate and short-path distillation of the residual ketone (70–75°/11 torr), there are obtained 142 mg. of 6-methyl-5-hepten-2-one. I.R. spectrum (CCl₄): bands at 1725, 1380, 1360 cm.⁻¹; NMR spectrum (CDCl₃): δ=1.63 (slightly resolved s, 3H); 1.67 (slightly resolved s, 3H); 2.11 (s, 3H); 5.07 (m, 1H) p.p.m.

Example 7

200 mg. of nootkatone and 5.5 mg. of chromium (III) chloride hexahydrate are hermetically sealed under high vacuum in a Pyrex glass tube and this is heated at 220° for 25 minutes with constant agitation. After cooling, the reaction mixture is taken up in ether, the ethereal suspension filtered over 0.5 g. of silica gel and the solvent removed from the filtrate by evaporation to yield 200 mg. of crude product. Short-path distillation of the residue (100°/0.05 torr) yields 193 mg. of oil, gas-chromatographic analysis of which gives a content of 57% α-vetivone besides starting material and other double bond isomers.

Example 8

200 mg. of nootkatone and 5.5 mg. of copper(II) chloride dihydrate are hermetically sealed under high vacuum in a Pyrex glass tube and this is heated at 160° for 30 minutes with constant agitation. After cooling, the reaction mixture is taken up in ether, the ethereal suspension filtered over 0.5 g. of silica gel and the solvent removed by evaporation of the filtrate to yield 200 mg. of crude product. Short-path distillation of this product (120°/0.1 torr) yields 180 mg. of oil, gas-chromatographic analysis of which gives a content of 57% α-vetivone besides starting material and other double bond isomers.

Example 9

200 mg. of nootkatone and 8 mg. of zinc (II) chloride are hermetically sealed under high vacuum in a Pyrex glass tube and this is heated at 220° for 120 minutes with constant agitation. After cooling, the reaction is taken up in ether, the ethereal suspension filtered over 0.5 g. of silica gel and the solvent removed by evaporation of the filtrate to yield 200 mg. of crude product. Short-path distillation of this product (105°/0.05 torr) yields 155 mg. of oil, gas-chromatographic analysis of which gives a content of 53% α-vetivone besides starting material and other double bond isomers.

Example 10

200 mg. of 4a-methyl-6 - isopropenyl - 2,3,4,4a,5,6,7,8-octahydro-naphthalenone and 5.5 mg. of cobalt (II) chloride hexahydrate are hermetically sealed under vacuum in a Pyrex glass tube and this is heated at 203° for 30 minutes with constant agitation. After cooling the reaction mixture is taken up in ether, the ethereal mixture is filtered over 0.5 g. of silica gel and the solvent removed from the filtrate by evaporation to yield 178 mg. of crude product. Short-path distillation yields an oil (154 mg., B.P. 110–120°/0.05 torr) comprising 63% of 4-a-methyl-6-isopropylidene-2,3,4,4a,5,6,7,8-octahydro - 2 - naphthalenone, starting material and various unsaturated isomers thereof. I.R.: (CCl₄ ν1675, 1625 cm.⁻¹; U.V. (ethanol): λmax 233 nm. (ε=11.350), 260–280 nm. (ε=5850, shoulder); N.M.R. (CDCl₃). δ=1.66 (s, 3H); 1.75 (s, 5H); 5.77 (s, 1H) p.p.m.

Example 11

3.20 g. of 6-isopropenyl-2,3,4,4a,5,6,7,8-octahydro-2-octahydro-2-naphthalenone are heated in a round bottom flask in the presence of 0.096 g. of cobalt chloride hexahydrate. Heating proceeds for 80 minutes at 180° under a nitrogen atmosphere under reflux with constant stirring. The mixture is cooled, taken up in ether, filtered and the solvent removed from the filtrate by evaporation to yield 2.95 g. of crude product. Short-path distillation yields an oil (1.77 g., B.P. 100°/0.003 torr. Gas-chromatographic analysis of this distillate shows that the oil comprises 30% of 6-isopropylidene-2,3,4,4a,5,6,7,8-octahydro-2-naphthalenone, 12% starting material and other unsaturated isomers.

I.R. (CCl₄): ν1675, 1625, 1590 cm.⁻¹; U.V. (ethanol): λmax 234 nm. (ε=8150), 282 nm. (ε=6900).

We claim:

1. A process for the catalytic isomerisation of a compound of a general formula

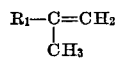

into a compound of general formula

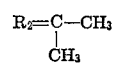

wherein R₂ is monodeshydro R₁ and R₁ is selected from the group consisting of radicals of the general formulae

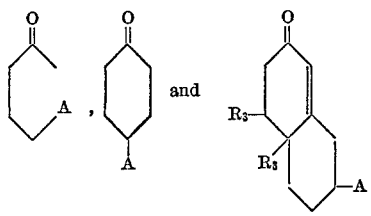

having one open single bond at the carbon atoms indicated at A above and wherein R₃ is hydrogen or methyl, which comprises heating the starting material in liquid phase with a mineral acid salt of a transition metal of the 4th period having an atomic weight greater than 50.

2. A process according to claim 1, characterized in that a chromium, manganese, iron, cobalt, nickel, copper, or zinc salt is used as the catalyst.

3. A process according to claim 1, characterized in that a chloride is used as the salt.

4. A process according to claim 3 wherein the salt is a hydrated chloride.

5. A process according to claim 3, characterized in that 4α,4aα-dimethyl-6β-isopropenyl-2,3,4,4a,5,6,7,8,-octahydro-2-naphthalenone is catalytically isomerised to 4α, 4aα - dimethyl - 6 - isopropylidene - 2,3,4,4a,5,6,7,8-octahydro-2-naphthalenone.

6. A process according to claim 3, characterized in that 4-isopropenyl-cyclohexanone is catalytically isomerised to 4-isopropylidene-cyclohexanone.

7. A process according to claim 3, characterized in that 6-methyl-6-hepten-2-one is catalytically isomerised to 6-methyl-5-hepten-2-one.

8. A process according to claim 3, characterized in that 4a-methyl - 6 - isopropenyl - 2,3,4,4a,5,6,7,8-octahydro-2-naphthalenone is catalytically isomerised to 4a-methyl-6-isopropylidene - 2,3,4,4a,5,6,7,8 - octahydro - 2 - naphthalenone.

9. A process according to claim 3, characterized in that 6 - isopropenyl - 2,3,4,4a,5,6,7,8 - octahydro - 2 - naphthalenone is catalytically isomerised to 6-isopropylidene-2,3,4-4a,5,6,7,8-octahydro-2-naphthalenone.

References Cited

UNITED STATES PATENTS 3,188,350    6/1965    Martin et al. _____ 260—586 R

BERNARD HELFIN, Primary Examiner

N. MORGENSTERN, Assistant Examiner

U.S. Cl. X.R.

260—593 R

UNITED STATES PATENT OFFICE
CERTIFICATE OF CORRECTION

Patent No. 3,816,535　　　　　　　　　　Dated June 11, 1974

Inventor(s) Marianne Hug-Inderbitzin et al.

It is certified that error appears in the above-identified patent and that said Letters Patent are hereby corrected as shown below:

Column 1, line 39: "recreation" should be -- reaction --.

Column 3, line 6, "10-" should read -- $10^{-3}$ --.

Column 5, lines 68 and 69, "2-octahydro-2" should read -- -2 --.

Signed and sealed this 13th day of May 1975.

(SEAL)
Attest:

RUTH C. MASON
Attesting Officer

C. MARSHALL DANN
Commissioner of Patents
and Trademarks